Aug. 21, 1956    R. M. SOEHNLEN ET AL    2,759,254
METHOD OF CONNECTING FLUID PIPES
Filed Aug. 17, 1953
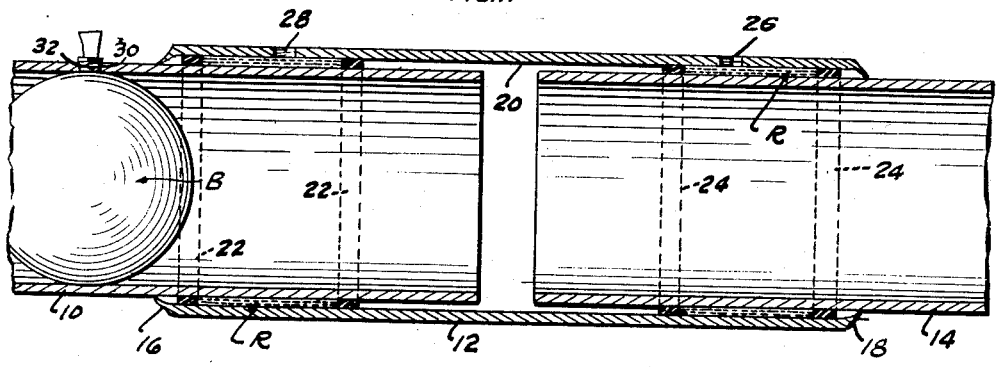
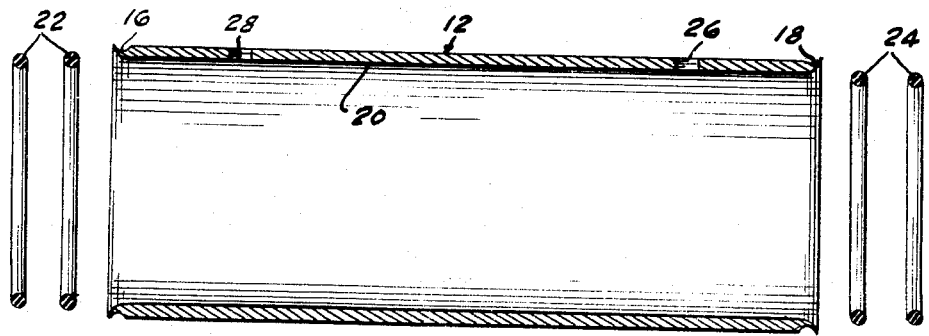
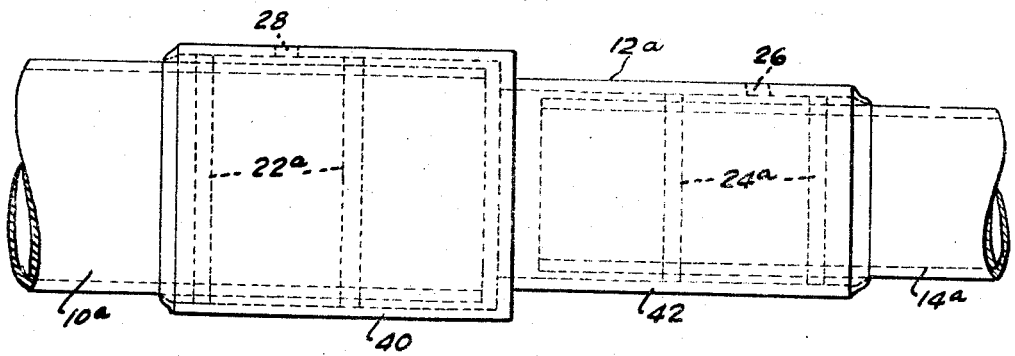
INVENTORS.
ROBERT M. SOEHNLEN
EUGENE ALTERS
ATTORNEY

United States Patent Office 2,759,254
Patented Aug. 21, 1956

2,759,254

METHOD OF CONNECTING FLUID PIPES

Robert M. Soehnlen, Beloit, and Eugene Alters, Fond du Lac, Wis.

Application August 17, 1953, Serial No. 374,492

8 Claims. (Cl. 29—428)

Our invention relates to a method of connecting fluid pipes.

Our invention relates more particularly to a method of connecting fluid pipes and particularly end to end extensions of fluid pipes that are filled with fluid under pressure.

In the extension of fluid carrying conduits or pipes, it is frequently desirable to connect an extension to the end of a conduit or pipe line that is filled with a fluid such as gas, water or other similar substance. In making a connection of this type it is necessary to seal off the escape of fluid at the end of the line to which an extension is to be added or a repair is to be made. Also, it is desirable to make a connection between the end of the line and an extension therefrom in the easiest, safest, and quickest manner possible. To this end it is an object of the present invention to provide a simple, quick, safe and effective method of connecting together in end to end relation an extension from a pipe line or conduit filled with a fluid.

It is a further object of the invention to provide a method of doing this that contemplates the provision of an effective temporary seal adjacent the end of a fluid filled pipe line, providing a sleeve assembly for a connector that is easily and quickly assembled over the abutting ends of the pipe line and the extension, and then easily and quickly removing the temporary seal.

Other objects and advantages will be more apparent from the following description wherein reference is had to the accompanying drawings, upon which:

Fig. 1 is a cross-sectional view of a pair of pipe or conduit sections in end-to-end juxtaposition showing the sleeve assembly about the same for connecting them together and the temporary seal which we employ for sealing off the escape of fluid from the pipe line;

Fig. 2 is a cross-sectional view of the sleeve which we employ;

Figs. 3 and 4 are cross-sectional views of the rubber gaskets which are employed; and Fig. 5 is a side elevational view of a pair of pipes or conduits in end-to-end relation with the sleeve assembly thereon, one of said pipes being of a different diameter than the other.

In Fig. 1, we have shown a main line or conduit 10, which is adapted to contain fluid such as gas, water or other similar substances under pressure, connected to an extension pipe 14 by a cylindrical sleeve 12 in accordance with the principles of our invention.

The sleeve 12 of the illustrated embodiment is cylindrical and has its ends 16 and 18 formed with a reduced lip for a purpose hereinafter described. The internal diameter 20 of the sleeve 12 is preferably somewhat larger than the external diameter of the conduit 10 and extension 14 since the ends of the latter elements are to be inserted into the sleeve 12.

Positioned between the sleeve 12 and the end of conduit 10 is a pair of rubber gaskets 22, such as the illustrated O-ring seals, and a similar pair of rubber gaskets 24 or O-ring seals are positioned between the sleeve 12 and the end of extension 14. And, in accordance with our invention, we form openings 26 and 28 in each end of the sleeve, which are to be positioned between the respective gaskets or seals of each pair thereof in the manner hereinafter described. We prefer to insert under pressure a rubber cement R, such as a plastic base compound known as polysulfide elastometer, through the respective holes 26 and 28 to form an effective fluid tight bond between the exterior surfaces of the conduit and extension, respectively, and the interior surface of the sleeve.

Assuming that the pressure in the line is quite low, or has been turned off completely at a point upstream from the end of conduit 10, the rubber gaskets 22 and 24 should first be mounted on the respective ends of conduit 10 and extension 14, with the gaskets or seals of each pair being spaced apart somewhat further than illustrated in Figure 1. With the extension 14 moved to one side, one end of the sleeve 12 is placed over the end of the conduit 10 and brought into contact with the first gasket 22. The sleeve is then moved toward the second gasket whereupon the first gasket is rolled into sealing engagement with the internal surface of the sleeve, and rolls along the exterior surface of conduit 10 toward the second gasket. Further movement in this direction will bring the end of the sleeve into contact with the second gasket, and roll it under the sleeve into sealing engagement therewith. After the second gasket has been rolled under the sleeve, the sleeve should be urged further over the end of conduit 10 a distance equivalent to the amount that the sleeve will extend over the extension 10. The end of the extension 14 is then positioned adjacent the other end of the sleeve, and the sleeve pushed over said extension and into contact with the two gaskets 24 as described above. After the second gasket 24 has been rolled under the end of the sleeve, the sleeve and gaskets should be positioned somewhat as shown in Figure 1.

The said rubber cement R may then be inserted through the respective openings 26 and 28, and these openings closed, if so desired, by any suitable screw-threaded closures or plugs.

The rubber compound R forms an effective seal by adhesion, since it is of the type that adheres to surfaces which it contacts. This feature of the invention, together with the sealing effect of gaskets 22 and 24, effectively seals off the connector elements from leakage. Since the rubber compound when dry and the O-ring seals are quite flexible, some vibration or movement of the respective pipes with respect to the sleeve 12 is permitted without danger of breaking the seal.

As previously stated, the opposed ends of the sleeve 12 are formed with a thin lip which is bent or crimped downwardly to make line contact with the exterior surface of the pipe line and extension conduit when rubber cement is used. If it is preferred, the lips 16 and 18 may be welded to the exterior of the pipe line and the extension, and the introduction of rubber cement or other sealing material may be omitted.

As previously stated, it is sometimes desirable or necessary to provide a temporary seal at the end of the pipe line to which the extension is to be connected before applying the sleeve 12. For this purpose we have provided an opening 30 near the end of the pipe line 10 in which can be tapped a plug 32 that has a collapsible stopper bag B connected thereto. This stopper bag may be blown up so that the surface of the same makes contact through the entire diameter of the pipe line 10 to effectively close the conduit opening and make a temporary seal. When the connector has been suitably affixed to the abutting ends of the pipe line and extension, the plug 32 may be manipulated to release the air from the balloon portion thereof, and the same may be removed from the pipe line and a closure plug substituted for the same.

In Fig. 5 we have shown a modified form of the invention wherein we provide a pipe line 10a, an extension line 14a of a reduced size, and a connector member 12a which has a sleeve portion 40 with an opening of a diameter larger than the outside diameter of the pipe line 10a, and a reduced sleeve portion 42 that has an opening of a diameter larger than the extension conduit 14a. In this assembly suitable pairs of gaskets 22a and 24a are employed, the gaskets 24a being necessarily smaller in diameter than the gaskets 22a. In a similar manner, the ends may be either welded or crimped downwardly to line engagement with the outer periphery of the conduits and rubber cement may be employed as previously explained.

From the above and foregoing description it can be seen that we have provided a novel method of connecting together pipe lines and extensions therefor, and a simple, safe, practical and inexpensive sleeve assembly for effecting this purpose. The feature of sealing off the fluid with the stopper bag enables the pipe to be safely welded regardless of the type of fluid in the line. In addition, when there is fluid in the pipe line, we have provided an effective method of easily and quickly closing off or sealing the end of a pipe line to make the connection to the extension line.

We contemplate that changes and modification may be made in the exact details shown and we do not wish to be limited in any particular; rather what we desire to secure and protect by Letters Patent of the United States is:

1. The method of connecting an extension conduit to a fluid filled pipe line which consists of placing a deflated stopper bag in the pipe line adjacent its end, blowing up the stopper bag to seal off the end of said pipe line, telescopically placing a sleeve over the end of said pipe line and inserting the aligned end of an extension pipe into the other end of said sleeve and filling the space between the interior diameter of said sleeve and the exterior diameter of both the pipe line and the extension with rubber cement.

2. The method of connecting an extension conduit to a fluid filled pipe line which consists of placing a deflated stopper bag in the pipe line adjacent its end, blowing up the stopper bag to seal off the end of said pipe line, telescopically placing a sleeve over the end of said pipe line and inserting the aligned end of an extension pipe into the other end of said sleeve, filling the space between the interior diameter of said sleeve and the exterior diameter of both the pipe line and the extension with rubber cement and then welding the open edges of said sleeve, one to said pipe line and the other to said extension.

3. The method of connecting an extension conduit to a fluid filled pipe line which consists of placing a deflated balloon in the pipe line adjacent its end, blowing up the balloon to seal off the end of said pipe line, telescopically placing a sleeve over the end of said pipe line and inserting the aligned end of an extension pipe into the other end of said sleeve, filling the space between the interior diameter of said sleeve and the exterior diameter of both the pipe line and the extension with rubber cement, welding the open edges of said sleeve, one to said pipe line and the other to said extension, and then deflating the balloon and removing it from the pipe line.

4. The method of connecting an extension conduit to a fluid filled pipe line which consists of telescopically placing a sleeve over the end of said pipe line and inserting the aligned end of an extension pipe into the other end of said sleeve, filling the space between the interior diameter of said sleeve and the exterior diameter of both the pipe line and the extension with rubber cement and then bending down the open edges of said sleeve, one edge against the pipe line and the other edge against the extension.

5. The method of connecting an extension conduit to a fluid filled pipe line which consists of inserting a deflated balloon in the pipe line adjacent its end, blowing up the balloon to seal off the end of said pipe line, telescopically placing a sleeve over the end of said pipe line and inserting the aligned ends of an extension pipe into the other end of said sleeve, filling the space between the interior diameter of said sleeve and the exterior diameter of both the pipe line and the extension with rubber cement and then crimping down the open edges of said sleeve, one edge against the pipe line and the other edge against the extension.

6. The method of securing a sleeve between adjacent ends of a fluid filled pipe line and an extension conduit including the step of sealing off the end of said pipe line by placing a deflated bag in said pipe line adjacent its end and expanding said bag.

7. The method of securing a sleeve between adjacent ends of a fluid filled pipe line and an extension conduit including the steps of temporarily sealing off the end of said pipe line, placing said sleeve in telescoping relationship over said adjacent ends of said pipe line and said extension conduit, and cementing said sleeve to said pipe line and said extension conduit.

8. The method of securing a sleeve to adjacent pipe ends including the steps of placing said sleeve in telescoping relationship with said adjacent ends and at the same time forming a closed annular chamber between each of said ends and said sleeve, and filling said chambers with cement.

References Cited in the file of this patent

UNITED STATES PATENTS

| | | |
|---|---|---|
| 2,093,092 | McElhany | Sept. 14, 1937 |
| 2,216,686 | Fentress | Oct. 1, 1940 |
| 2,447,221 | Warring | Aug. 17, 1948 |
| 2,582,746 | Champion | Jan. 15, 1952 |